No. 815,725. PATENTED MAR. 20, 1906.
C. R. MARTINEAU.
MECHANICAL ADDING DEVICE.
APPLICATION FILED MAR. 31, 1903.
13 SHEETS—SHEET 2.
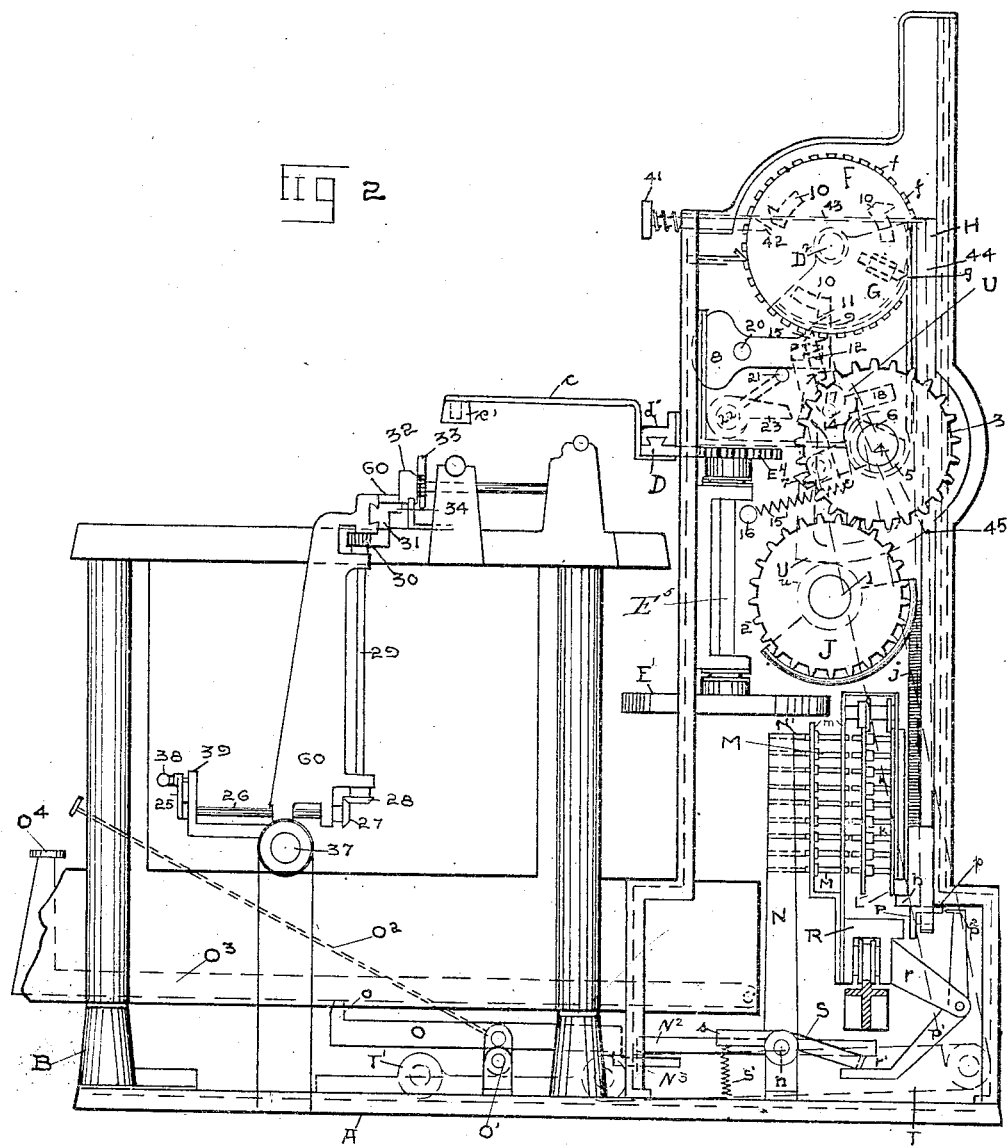
WITNESSES
INVENTOR
Clarence R. Martineau
By Ward & Cameron
Attorneys.

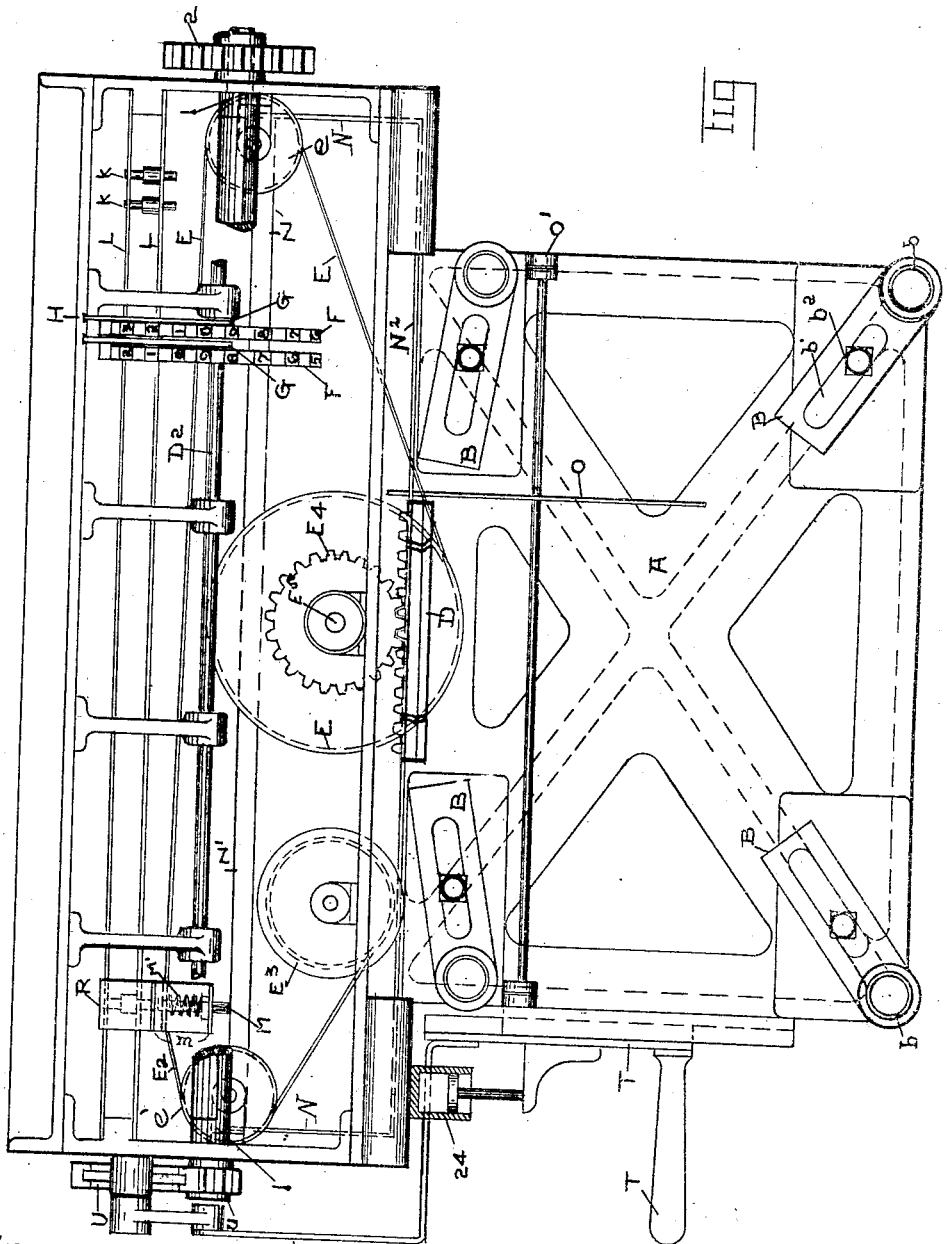

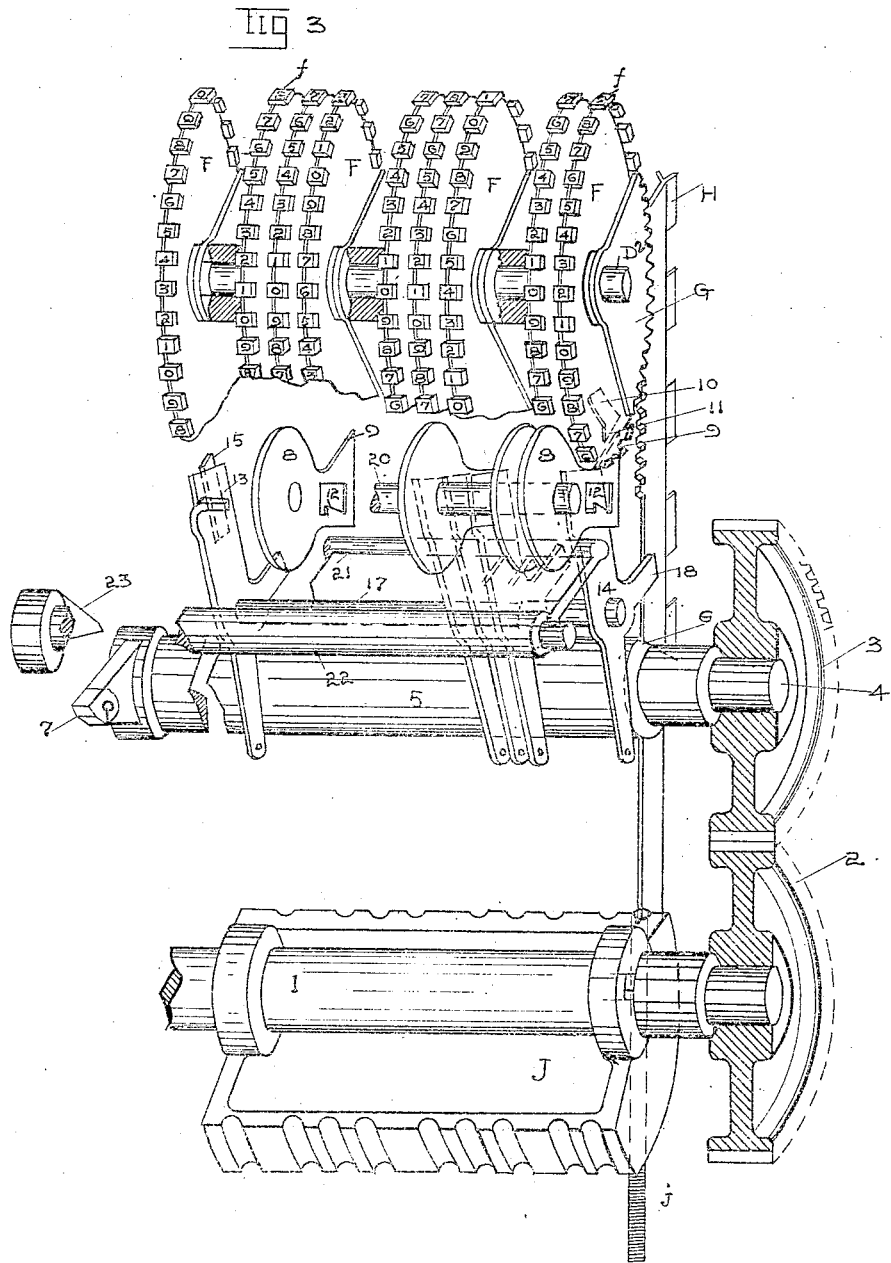

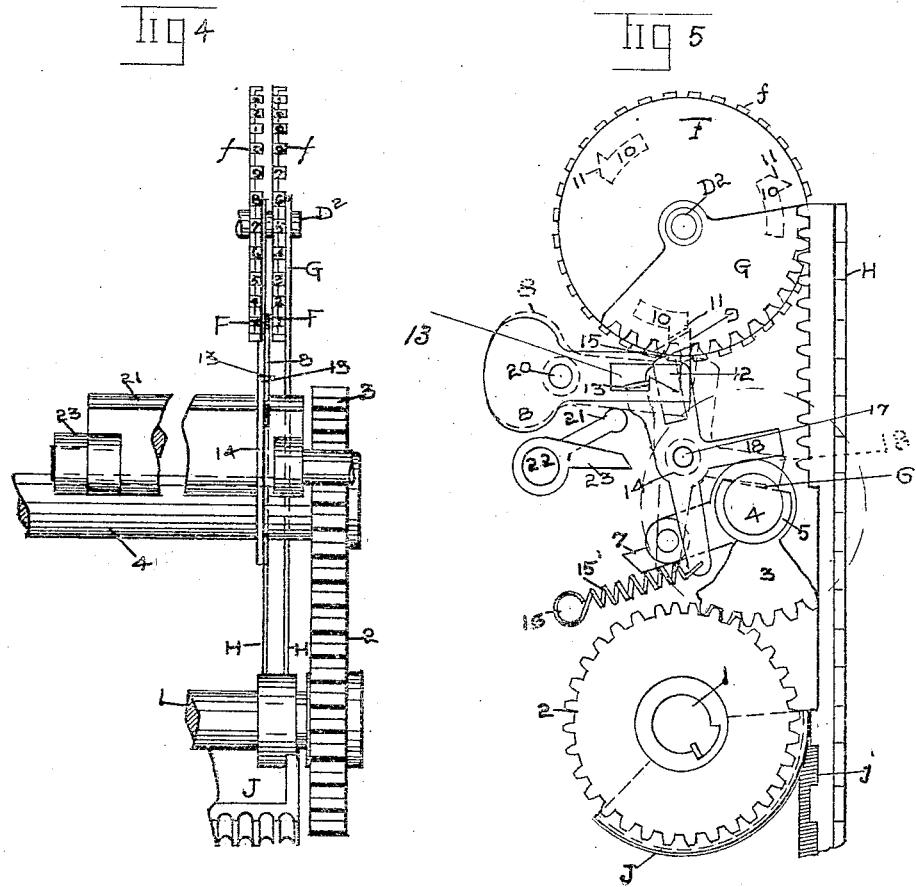

No. 815,725. PATENTED MAR. 20, 1906.
C. R. MARTINEAU.
MECHANICAL ADDING DEVICE
APPLICATION FILED MAR. 31, 1903
13 SHEETS—SHEET 5.
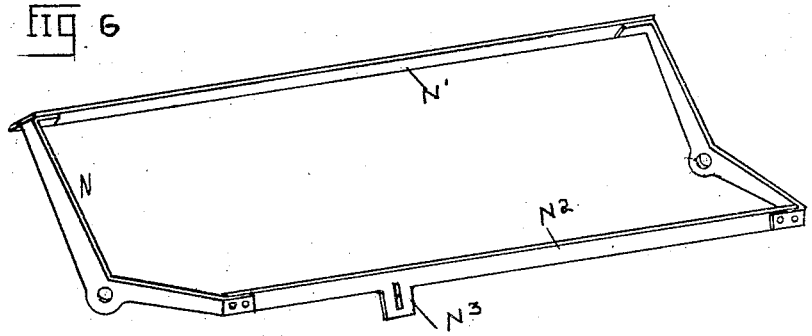
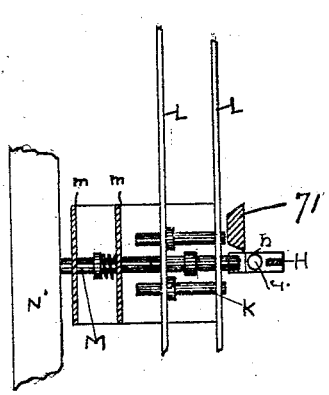
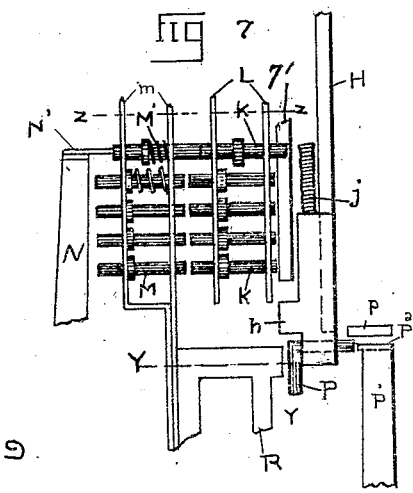
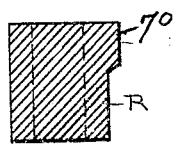
WITNESSES
INVENTOR
Clarence R. Martineau
By Ward Cameron
Attorneys

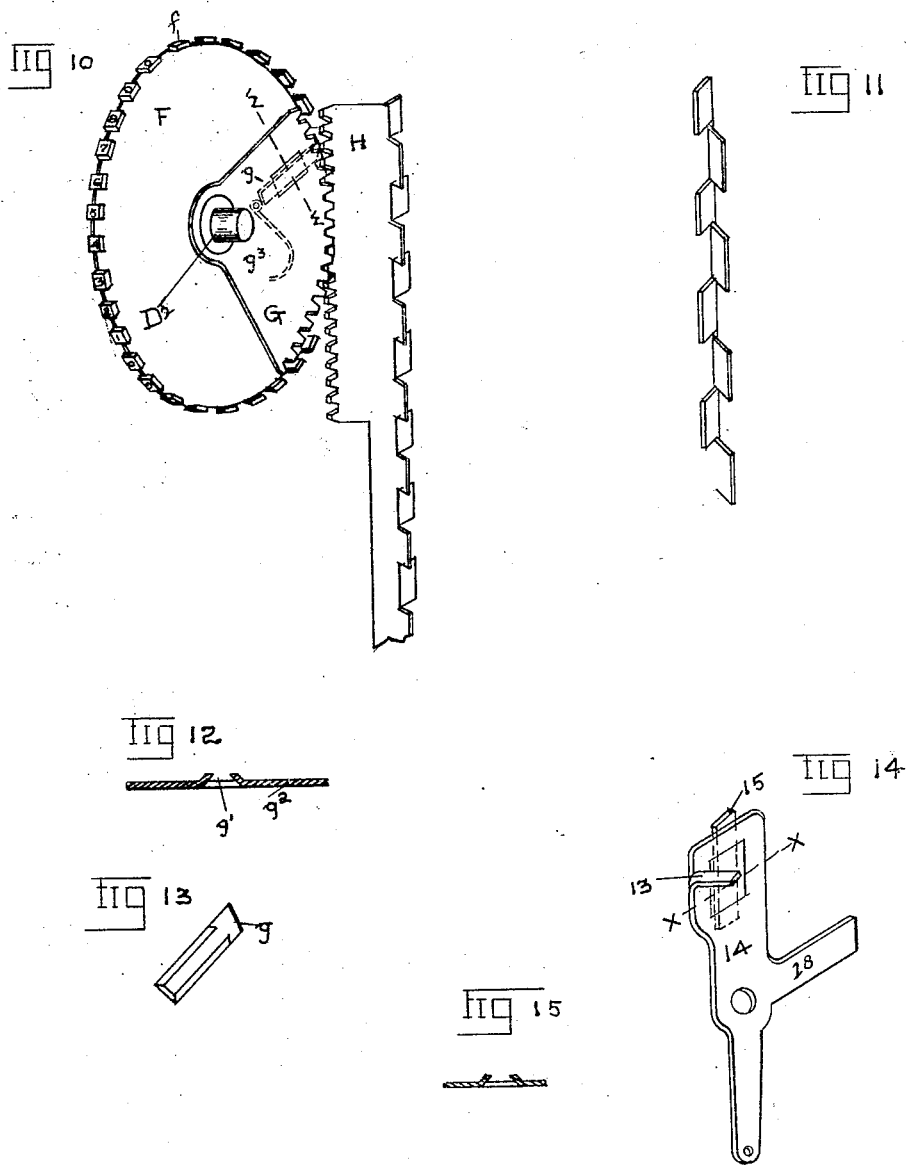

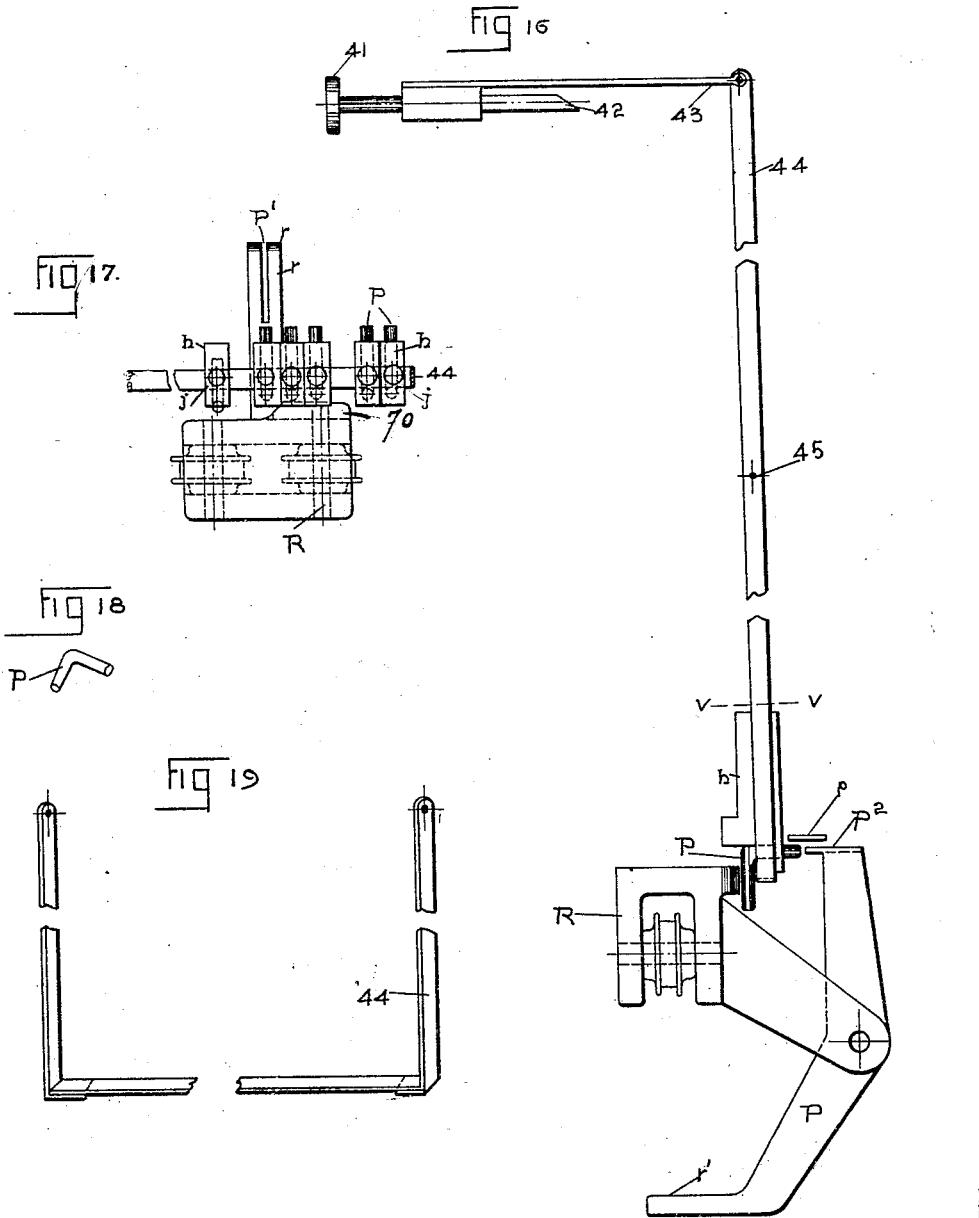

No. 815,725. PATENTED MAR. 20, 1906.
C. R. MARTINEAU.
MECHANICAL ADDING DEVICE.
APPLICATION FILED MAR. 31, 1903.
13 SHEETS—SHEET 8.
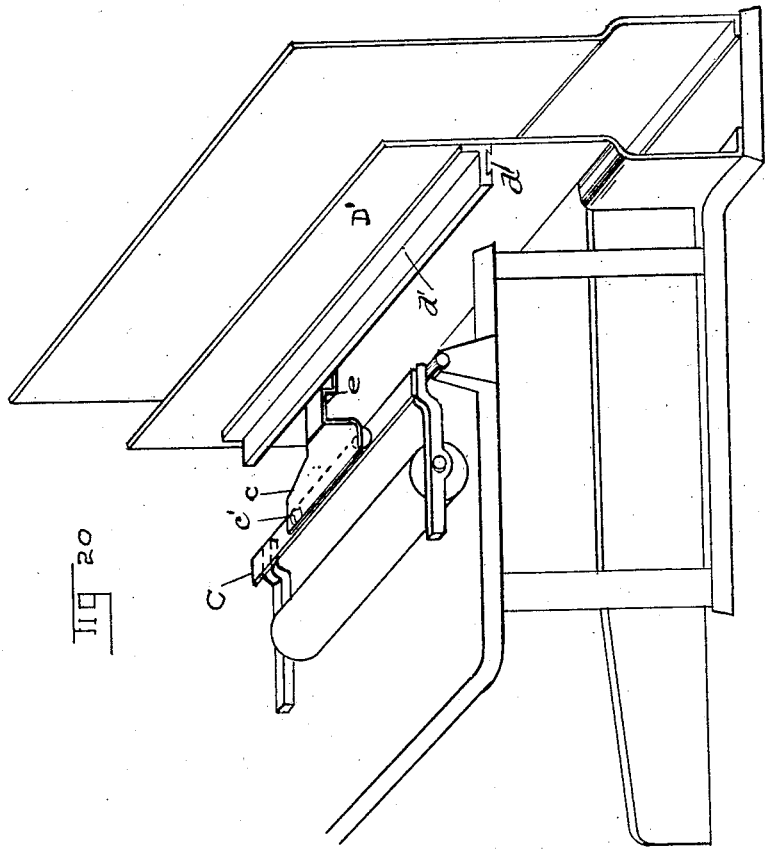
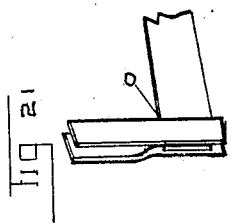
WITNESSES
INVENTOR
Clarence R. Martineau
BY Ward Cameron
Attorneys

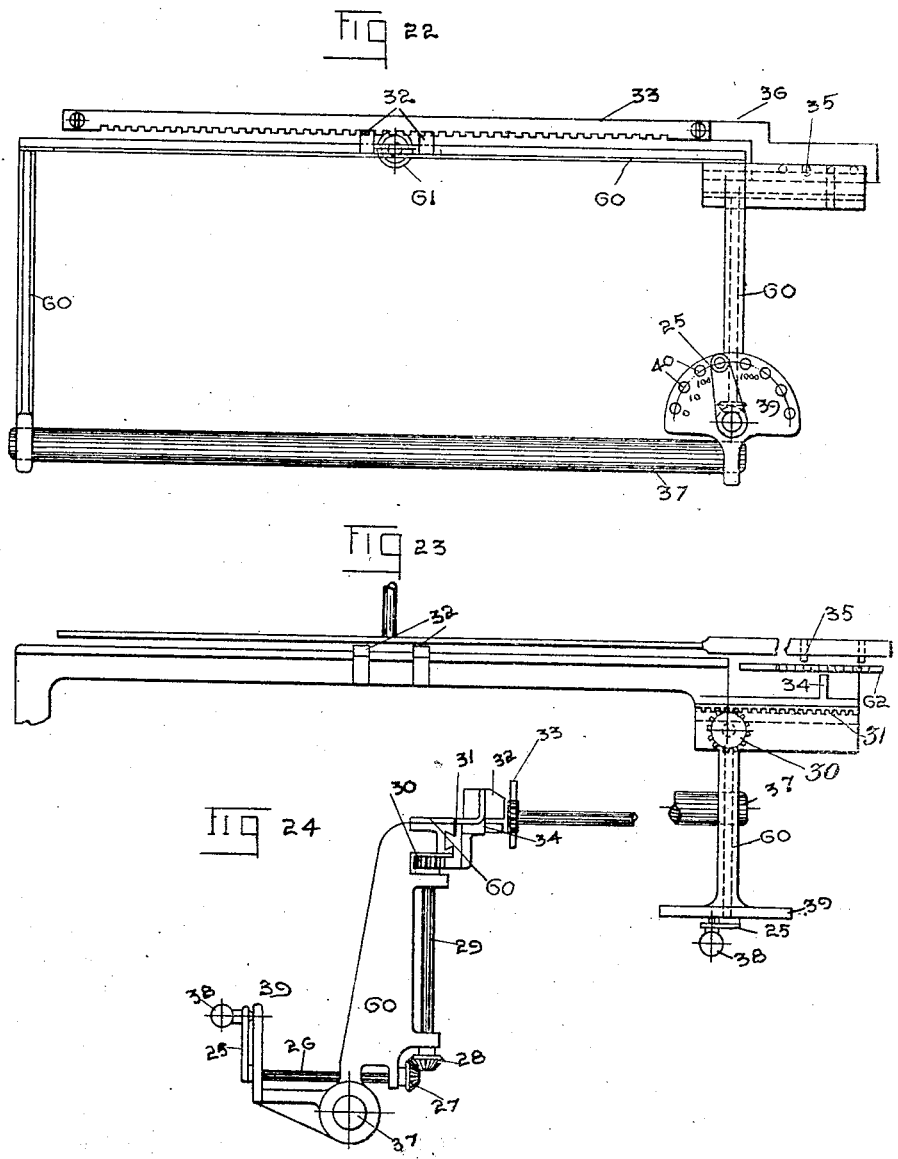

No. 815,725. PATENTED MAR. 20, 1906.
C. R. MARTINEAU.
MECHANICAL ADDING DEVICE.
APPLICATION FILED MAR. 31, 1903.
13 SHEETS—SHEET 10.
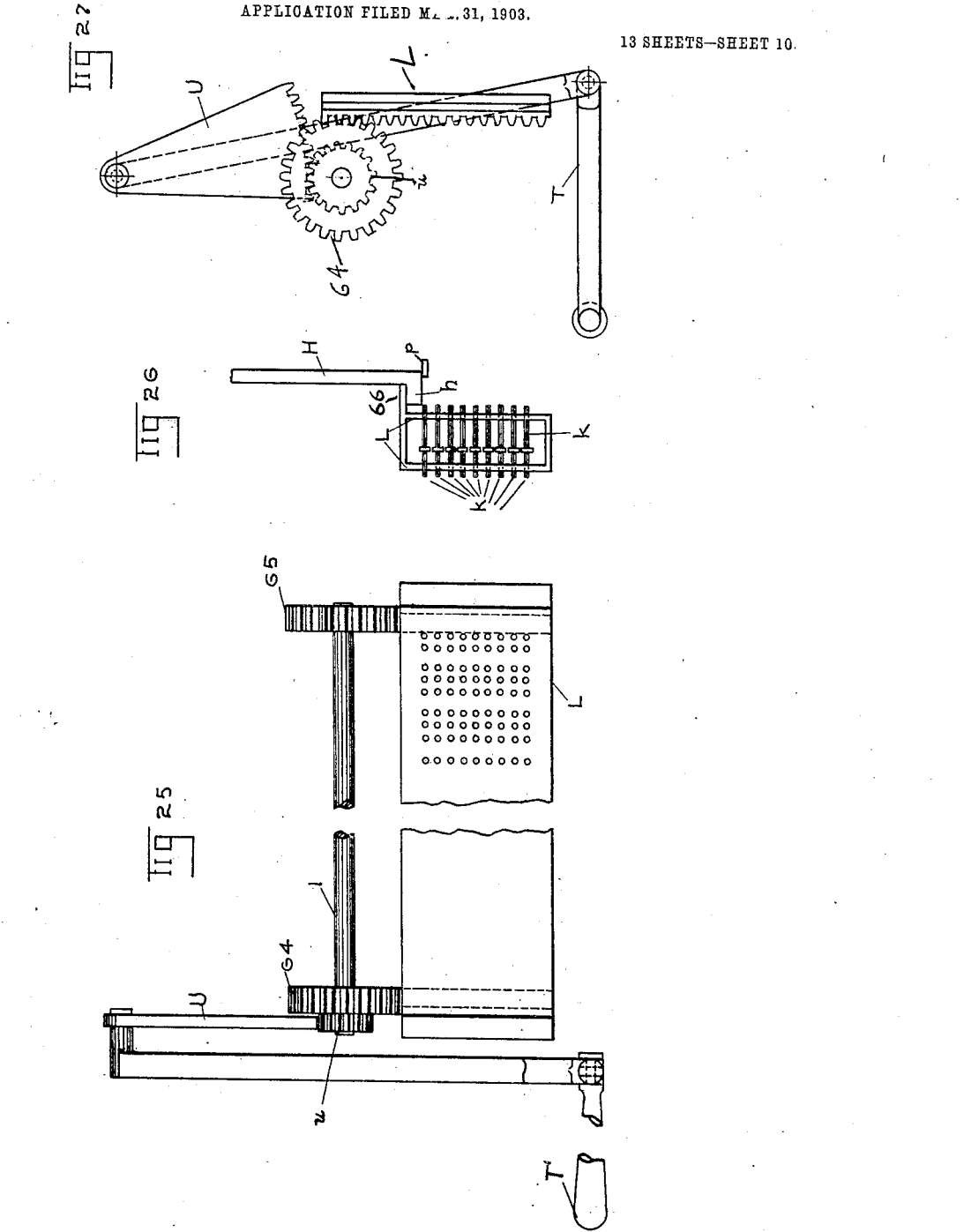
WITNESSES
INVENTOR
Clarence R. Martineau
By Ward & Cameron
Attorneys No. 815,725. PATENTED MAR. 20, 1906.
C. R. MARTINEAU.
MECHANICAL ADDING DEVICE.
APPLICATION FILED MAR. 31, 1903.
13 SHEETS—SHEET 11.
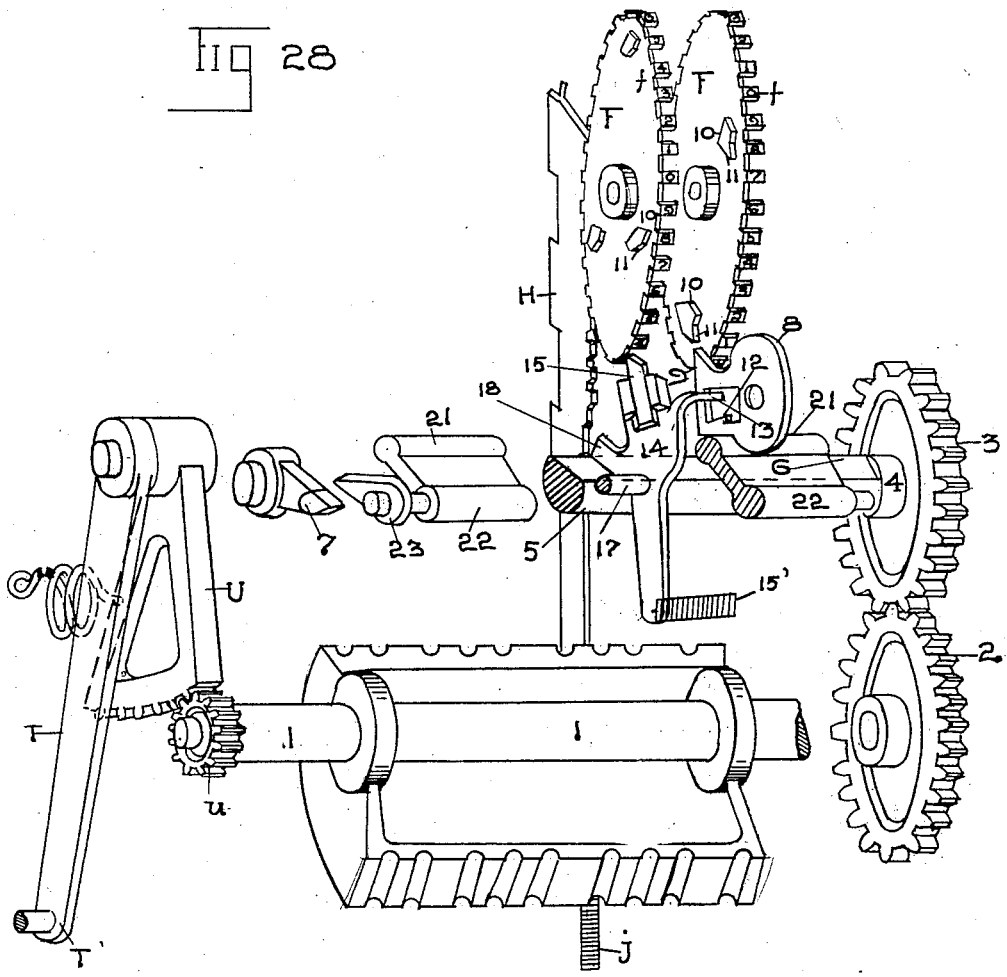
WITNESSES
INVENTOR
Clarence R. Martineau
by Ward & Cameron
Attorneys

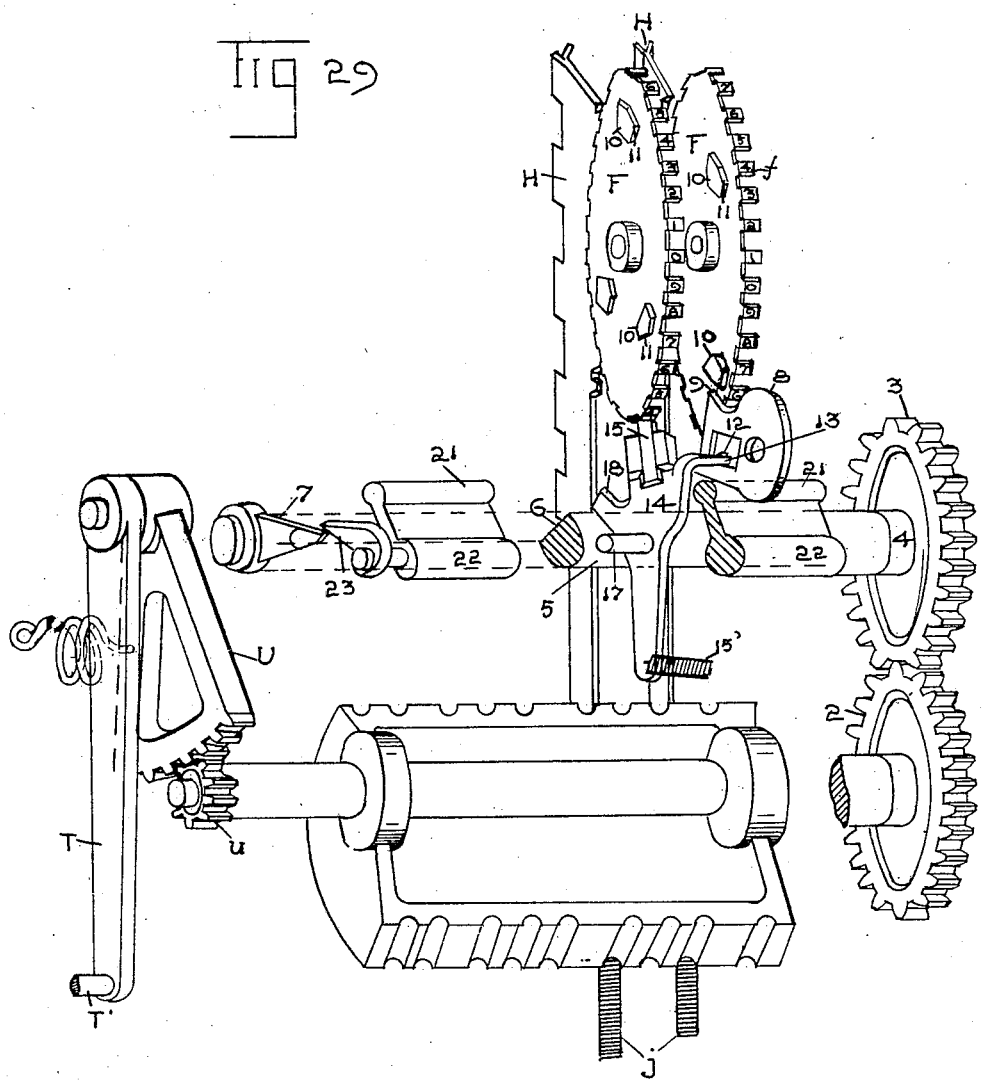

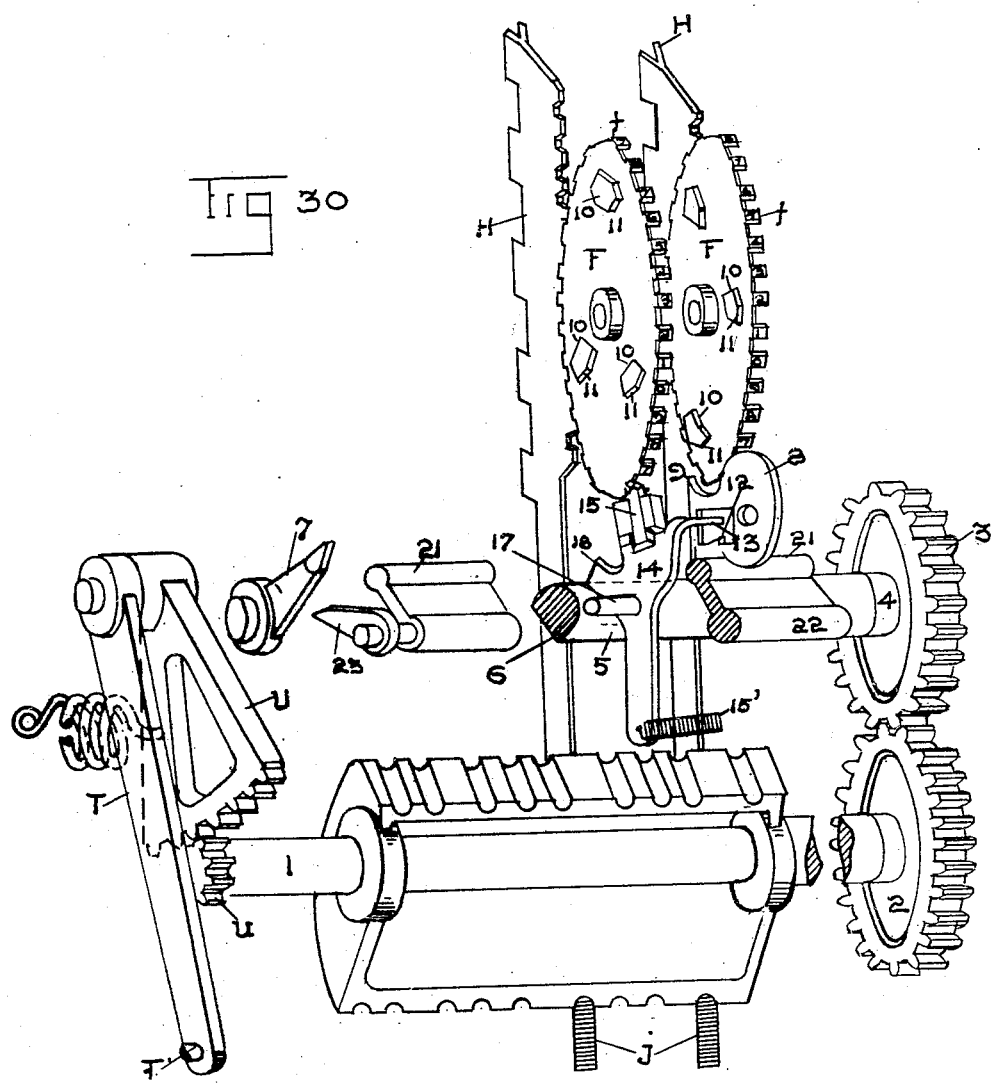

UNITED STATES PATENT OFFICE.

CLARENCE R. MARTINEAU, OF ALBANY, NEW YORK, ASSIGNOR TO TYPEWRITER ADDING MACHINE COMPANY, A CORPORATION OF NEW YORK.

MECHANICAL ADDING DEVICE.

No. 815,725.  Specification of Letters Patent.  Patented March 20, 1906.

Application filed March 31, 1903. Serial No. 150,414.

*To all whom it may concern:*

Be it known that I, CLARENCE R. MARTINEAU, a citizen of the United States of America, and a resident of the city and county of Albany and State of New York, have invented certain new and useful Improvements in Mechanical Adding Devices, of which the following is a specification.

My invention relates to mechanical adding devices; and the object of my invention is to provide an adding device and tabulator adapted to be connected with a type-writing machine, so adjusted and connected up that the adding device may be operated in connection with the type-writing machine, together with such elements and combinations as are hereinafter more expressly set forth and claimed. I attain this object by means of the mechanism illustrated in the accompanying drawings, in which—

Figure 1 is a plan. Fig. 2 is a side elevation. Fig. 3 is a perspective view of the adding and carry device with parts broken away. Fig. 4 is a front view of the adding and carry device with parts broken away. Fig. 5 is a side elevation of the adding and carry device with parts broken away. Fig. 6 is a perspective view of the driving-frame. Fig. 7 is a detail side elevation of the rack-pins and their connections with parts broken away. Fig. 8 is a horizontal section along the lines Z Z on Fig. 7. Fig. 9 is a horizontal section along the lines Y Y on Fig. 7. Fig. 10 is a perspective view of one of the adding-wheels and operating-rack with parts broken away. Fig. 11 is a rear elevation of the operating-rack. Fig. 12 is a section along the lines W W on Fig. 10. Fig. 13 is a perspective view of the pawl. Fig. 14 is a perspective view of the trip. Fig. 15 is a section along the lines X X on Fig. 14. Fig. 16 is a detail view in elevation of the key and yoke to return the wheels to "0." Fig. 17 is a horizontal section along the lines V V on Fig. 16. Fig. 18 is a perspective view of one of the retaining-pins. Fig. 19 is a rear elevation of the yoke shown in side elevation in Fig. 16. Fig. 20 is a perspective view of a type-writer, showing manner of attaching frame for adding device (not shown) thereto. Fig. 21 is a perspective view of the U-shaped key connection. Fig. 22 is a front elevation of the tabulator. Fig. 23 is a plan of the tabulator. Fig. 24 is a side elevation of the tabulator. Fig. 25 is a detail view in elevation of a modified form of means for raising the adding-wheel racks. Fig. 26 is an end elevation, with parts broken away, of the modified form shown in Fig. 25. Fig. 27 is a detail end elevation of the modified form shown in Fig. 25, showing connection between the lever and the gear and the adding-wheel rack. Fig. 28 is a perspective view with parts broken away and unnecessary supporting parts removed, illustrating the "carry" device, showing latch unlocked and disconnected. Fig. 29 is a perspective view with parts broken away and unnecessary supporting parts removed, illustrating the carry device, showing position of parts after partial movement of lever. Fig. 30 is a perspective view, with parts broken away and unnecessary supporting parts removed, illustrating the carry device, showing position of parts after full movement of lever.

Similar characters refer to similar parts throughout the several views.

I have provided a device for adding columns of figures adapted to be connected with a type-writing machine, so adjusted that the figures written by the type-writer on a paper placed in the usual manner on the type-writer carriage may be mechanically added and the amount of the addition shown by the wheels of the adding attachment, from which it may be copied by the typewriter onto the paper at the foot of the column added.

I have arranged my adding device in such a manner that it can be readily attached to a type-writing machine or removed therefrom without changing in any way the type-writing machine.

The adding-wheels F, Fig. 3, provided with letters $f$ on the circumference thereof, respectively, are operated by racks H, which racks are set in motion by the operation of those type-writer keys which print the figures in the ordinary use of the type-writer. The rotation of the wheels is determined by the extent of the movement of the racks H, respectively, and the movement of the racks H is determined by certain pins K, which are projected into the path of the movement of shoulder $h$, projecting from the racks H, respectively, and prevent the mechanism which causes the racks to move from carrying the racks past the projected pin. For this purpose a nest of pins K is arranged across the machine, and a carriage R, containing, preferably, a row of nine pins in a vertical column, is arranged to reciprocate backward and forward across the adding device, said carriage being adapted to move in unison with the carriage of a type-writing machine.

For the purpose of arranging my adding device so that it may be readily attached to any style of type-writing machine I have provided on the base-plate A (see Fig. 1) a series of adjustable feet B, each having a socket $b$, within which the foot of the type-writing machine may enter, and provided with a slot $b'$ and bolt $b^2$, the bolt passing into and through the plate A. Each of the feet B may thus have a universal movement, by means of which the supports may be adjusted to fit the feet of any type-writing machine.

In Fig. 20 I show in outline one means of attaching the carriage of a type-writing machine to the carriage of the adding device, (not shown,) which may be done, as therein shown, by securing the arm $c$ to the typewriter carriage C by means of the bolts $c'$ or by any other suitable fastening device. In Fig. 2 the arm $c$ engages with a rod D, carrying a rack engaging with the wheel $E^4$, which rack is capable of a reciprocating motion within the dovetailed-formed slot $d$, Fig. 20, within the strip $d'$, secured to the front $D'$ of the adding device.

The carriage proper (see Figs. 1, 2, and 7) of the adding-machine consists of a casting R, carrying a series of actuating-pins M, arranged, preferably, in a vertical column containing nine pins, said carriage also carrying with it the bifurcated support $r$, Figs. 2 and 16, to which is fulcrumed the rocking lever P', adapted for placing out of position the retaining-pins P, as hereinafter more particularly set forth.

I attach to one side of the carriage R (see Fig. 1) a band E, which passes over the pulley $e$ at the side of the machine and about a wheel E', the wheels E' and $E^4$ being mounted on the same spindle $E^5$, the wheel $E^4$ engaging with the rack on the rod D. At the other side of the carriage R, I attach the band $E^2$, passing over the pulley $e'$ and secured to a spring-coil $E^3$. The operation of the bands E and $E^2$ is to cause the band E to be wound onto the wheel E' as the carriage R is moved from left to right, the same movement operating to unwind the coil-spring $E^3$. The result is that when the carriage R is moved to the right the coil of the spring $E^3$ will be elongated. This operation of the bands, coil-spring, and connections therewith, with the carriage R, is substantially the same as that in use in the operation of the carriage of a type-writing machine. The rod D, carrying the rack, (see Fig. 1,) which moves in connection with the carriage of the type-writer, meshing with the wheel $E^4$, causes said wheel $E^4$ to move in the direction opposite to that of the said rod D. As thus connected up it is apparent that as the carriage of the typewriting machine moves from right to left the carriage of the adding device will move in the opposite direction—that is, from left to right.

For the purpose of adding the figures I have arranged a series of preferably nine adding-wheels F, (see Fig. 3,) along the periphery of each of which are projecting blocks $f$, or the wheel is cut leaving projections, upon each of which projection is placed a numeral. I preferably divide each wheel into three sections circumferentially, each section containing on its periphery the figures from "0" to "9," inclusive. I do not limit myself, however, to this particular division of the wheel.

I mount the wheel F on a suitable shaft $D^2$, supported by the frame of the machine. (See Figs. 1, 3, and 10.) In connection with each wheel F and mounted on the shaft $D^2$, adjacent to the wheel, I place a segment G, which engages with the operating-rack H and which segment engages with the adding-wheel F by means of the pawl $g$, placed within the groove $g'$, Fig. 12, in the plate $g^2$, which is attached to the segment G, and which pawl $g$ is retained in position within the groove $g'$ by means of the spring $g^3$, the end of the pawl $g$ engaging with the blocks or projections $f$ on the wheel F, which extend slightly beyond the face of the wheel. As thus arranged the movement of the rack H will cause the adding-wheel F to revolve, since the pawl $g$ engages with the projections on the periphery of said wheel F. It will be noted, however, that the operating end of the pawl $g$ is provided with an inclined surface, making one side of the pawl $g$ longer than the other. This is for the purpose of allowing the wheel F to revolve in one direction without engaging the pawl $g$. Thus, as shown in Fig. 10, as the rack H moves forward it carries with it the segment G and causes the wheel F to revolve, because the point of the pawl $g$ engages the projection on the periphery of the wheel F. The wheel F, however, could be revolved in the same direction without moving the rack, so far as the pawl $g$ is concerned.

The rack H is preferably provided along its rear edge with a groove, which may be made by causing alternate portions of the rack to be bent outward on opposite sides, as shown in Figs. 10 and 11. I do not, however, limit myself to this construction of the rear edge of the rack. The spring $j$, Figs. 2 and 7, is secured at one end to the segmental wheel J by passing the end of the wire of which said spring is constructed through a suitable eye (not shown) in the periphery of the segmental wheel and securing same thereto or attaching said spring to the wheel in any suitable manner. At the other end it is secured to the rack H by passing the end of the wire of which said spring is constructed through an eyelet in the rack and securing the same or attaching the spring to the rack in any suitable manner at or near that end of the rack farthest from the segment G. Thus the movement of the segmental wheel J will by the action of the spring $j$ raise the rack H, and thus rotate the adding-wheel. Each rack H has at its lower end a projecting shoulder $h$, (see Figs. 2 and 7,) and adjacent to each rack I arrange a series of pins K, preferably in a vertical line, which may be projected within the path of the movement of the shoulder $h$ of the rack H, thus determining the length of movement of the rack H, and therefore the rotation of the wheel F. In Fig. 7 I show in elevation a portion of the pins K, in which the upper one of the series is projected within the pathway of the shoulder $h$. (See Figs. 2 and 7.) The pins K are supported within suitable plates L, and in the carriage R, I arrange in like, preferably vertical line a series of actuating-pins M, supported in bars $m$, similar to the plates supporting the pins K. Between the bars $m$ I preferably place a coil-spring M' (see Figs. 1 and 7) for the purpose of causing the actuating-pins M to assume their normal position after having been forced forward for the purpose of projecting one of the pins K within the path of the shoulder $h$.

For the purpose of imparting motion to the actuating-pins M (see Figs. 2, 6, and 7) I arrange a series of drivers N, which are in the form of frames, (shown in Fig. 6,) said drivers having their side pieces in the form of an obtuse angle and secured to the frame of the machine by spindle $n$. (See Fig. 2.) The upper portion of the driver N' is adapted to engage one of the actuating-pins M. (See Figs. 1, 2, and 7.) It is understood that there are a series of these drivers mounted on the same spindle $n$, each one engaging the actuating-pin in its horizontal plane adjacent to its particular driving portion. The side of the driver-frame N² opposite the actuating portion N' is preferably provided with a slotted lug N³, (see Fig. 6,) through which slot the end of the lever O passes, (see Fig. 2,) the lever O, Fig. 2, being fulcrumed at O' and preferably capable of moving forward on the fulcrum, so that it may be disengaged when desired by pulling the rod O² forward. This may be accomplished by making the key connection O of a U-shaped form, as shown in Fig. 21, the sides of the U-shaped connection fitting underneath key-bar O³, and thus permitting of the movement of the lever O backward or forward by operation of key O². The lever O is preferably provided with the projection $o$, which in its normal position engages with the key-bar O³, which key-bar may be operated by pressing on the key O⁴. It is apparent that when one strikes the key O⁴ the key-bar is depressed, which will depress one end of the lever O and raise the other end, which will in turn raise the side N² of the driver-frame N, with which it engages, and thus press forward the driver N' of the driver-frame N, causing it to engage with an actuating-pin M adjacent to said driver, which will force the pin K, registering with the particular actuating-pin M, within the path of the shoulder $h$ and determine the amount of rotation which will be allowed the adding-wheel. (See Figs. 2 and 7.) In order that each of the racks may be held normally in position, I place a retaining-pin P, Figs. 2, 7, and 18, preferably right-angled, at the end of the rack, said pin passing through the rack and engaging with the shoulder $p$, Figs. 2 and 16, on the frame of the machine.

When the rack is to be moved, it is of course necessary to drive the pins P (see Fig. 2) out of contact with the shoulders $p$, and this I do by placing a rocking lever P' adjacent to each retaining-pin P, so weighted that it will normally be out of contact therewith, and which rocking lever is mounted in connection with the carriage R of the adding device by suitable brace $r$ and provided near one end with a horizontal portion $r'$, adapted to engage with the bell-crank lever S, mounted on the spindle $n$, so arranged that when one member $s$ of the bell-crank S is raised the rocking lever P' is put in motion, the upper end of which being provided with the projection P² forces the retaining-pin P out of contact with the shoulder $p$ and allows the rack to move. For the purpose of returning the bell-crank lever S to its normal position after it has been struck I preferably arrange a spring $s'$ to the member $s$ of the bell-crank lever S, the resiliency of said spring tending to depress said member and relieve the pressure on the rocking lever P', which being weighted will resume its normal position.

For the purpose of imparting motion to the adding-wheels I have arranged on one side of the machine, preferably at the left side of the operator, a lever T, (see Fig. 1,) which may have a handle T'. The lever is mounted in connection with the frame of the machine and by means of a segment U engages with a gear $u$ on the shaft 1, to which is keyed the segmental wheel J, Fig. 2. On the opposite end of the shaft 1, Figs. 2 and 5, is the gear 2, engaging with the gear 3 on the shaft 4, which shaft 4 has an enlarged portion 5, extending partially around the shaft, leaving on one side of the shaft a flattened portion 6. At the end of the shaft 4, Fig. 3, opposite the flattened portion 6 I arrange a dog 7, which projects toward the front of the machine. (See Figs. 2, 3, and 5.

Between each of the adding-wheels I arrange a latch 8, which has an upwardly-projecting inclined portion 9, adapted to engage with one of the three lifts 10, placed on the side of the adding-wheel. The lifts 10 are provided with an inclined portion 11, corresponding to the inclined portion 9 of the latch and so arranged that as the adding-wheel in its rotation causes the lift 10 to engage with the latch 8 it will depress the latch. The latch also has cut into it a projection 12, adapted to engage with a lip 13 on the trip 14, the lip 13, Fig. 14, being a horizontal projecting portion near one edge of the top of the trip 14. The trip 14 is provided at its end with an adjustable pawl 15, adapted to engage with one of the projections $f$ on the next adjacent wheel F. The lower portion of the trip 14 has attached to it a spring 15', (see Fig. 5,) which spring is attached at 16 to the frame of the machine. The trip 14 is also provided with a projecting arm 18, extending toward the rear of the machine, with which the enlarged portion 5 of the shaft 4 engages during a part of the revolution of said shaft. When, however, in the revolution of the wheels F one of the lifts 10 engages the projection 9 on the latch 8, the latch is pressed downward, and the projection 12 thereon releases the lip 13 of the trip, allowing the spring 15' to move the wheel F one space, the pawl 15 on the trip being in engagement with one of the projections $f$ on said wheel when the enlarged portion 5 of the shaft 4 is removed from contact with the arm 18 of the trip.

In the movement of the shaft 4 the enlarged portion 5 will strike against the arm 18, as shown by dotted lines in Fig. 5, and force the trip back in position, causing the projection 12 to again engage with the lip 13, as shown in full lines, Fig. 5. It is understood that there is a trip and latch for each of the adding-wheels F. This operation of the latch and trip is for the purpose of making the carry in the addition of the wheels—that is, to carry the tens to hundreds and the hundreds to thousands, &c.

For the purpose of insuring the position of the latches, which, by the way, are mounted upon a spindle 20, secured at its ends in a suitable manner to the frame of the machine, I place a guard (see Figs. 3 and 5) in the form of an open frame, which guard has a portion 21 resting against the under side of the latches 8 and another portion 22, provided at its end with a guard-arm 23, adapted to come in contact with the dog 7 in such a manner that in the revolution of the shaft 4, to which the dog 7 is attached, the guard-arm 23 may be raised, enabling the latch 8 to be depressed when the lifts 10 engage their inclined ends 9 for the purpose of making the carry, as hereinbefore described.

I have shown in Figs. 28, 29, and 30 an illustration, step by step, of the action that takes place to accomplish the carry.

Fig. 28 shows the position of the parts before operation and the position which the parts will occupy after a carry has been made. It will be noticed that the segment U, engaging the pinion $u$, is at the extreme end of the segment in the position that it occupies before the lever T is operated. In this figure also the trip 14 is "unlocked"—that is, the flattened portion 6 of the shaft 4 engages the arm 18. The guard 21 22 is depressed, and therefore does not engage the latch 8, and the lip 13 is out of engagement with the projection 12 on the latch 8, so that Fig. 28 shows the carry apparatus entirely out of connection ready to be operated upon. Fig. 29 shows the position of the parts after the lever T has been drawn forward a portion of its throw, the gear 3 has been rotated, but a complete revolution has not been made, the dog 7 on the shaft 4 is engaged with the guard-arm 23, and the portion 21 on the guard has been brought in contact with the latch 8. The rounded portion 5 of the shaft 4 is engaged with the arm 18 of the trip 14, and the lip 13 is engaged with the projection 12 in the opening in the latch 8. It will be noticed that the lift 10 on the wheel F is about to engage the portion 9 of the latch 8 for the purpose of making the carry.

In Fig. 30 I show the parts after the lever 7 has been drawn to the extent of its throw. The dog 7 has passed the end of the guard-arm 23, allowing the guard 21 to fall away from connection with the latch 8. The lift 10 has engaged the latch at 9 and has released the lip 13 from connection with the projection 12. The rounded portion 5 of the shaft, however, still holds locked the trip 14, although the lip has become disengaged from the projection 12 on the latch 8. When the lever T is forced back to its first position, (shown in Fig. 28,) the shaft 4 will be rotated, which will remove the rounded portion 5 of the shaft from contact with the arm 18, and the spring 15' will be allowed to pull forward the trip 14 at its lower end and cause the wheel F, with which the pawl is in engagement, to be moved one space. After the lever has reached the position shown in Fig. 28, which is thus accomplished by reversing the movement of the lever, the parts will be in the position shown in Fig. 28, the carry has been completed, and the parts are in position for a further operation of the machine.

In case there is no carry the first step illustrated in the movement after the parts have left the position shown in Fig. 28 will be that illustrated in Fig. 29, in which the rounded portion 5 of the shaft engages the arm 18 of the trip, the lip 13 engages the projection 12 in the latch 8, but there is no lift 10 about to engage the portion 9 of the latch 8, as shown in Fig. 29. Therefore after the movement of the wheel F the latch 8 is still in the position that it occupies in Fig. 29 even after the lever has been moved to the position shown in Fig. 30, and although the guard 21 is moved away from contact with the latch, the latch being held in this position by the engagement of the lip 13 with the projection 12, the latch being locked thereby. As the lever is reversed to take the position shown in Fig. 28 and the shaft 4 is rotated, so that the flattened portion 6 comes under the arm 18, still the connection between the latch 8, made by the lip 13 and projection 12, remains intact and they are locked together, and therefore the adding-wheel, with which the pawl 15 engages, is not moved. Thus there are two ways of locking the trip 14—first, by means of the enlarged portion 5 of the shaft 4 engaging the arm 18, and, second, by the engagement of the lip 13 and the projection 12 of the latch 8, respectively, which will hold the trip locked even when the flattened portion of the shaft is uppermost. The trip may be thus locked by either of the two ways, or they may act together to accomplish this result, as shown in Fig. 29, where the rounded or enlarged portion 5 engages the arm 18 and the lip 13 engages the projection 12. Thus both act together to lock the trip. In Fig. 30, however, the first manner of locking the trip is shown. The lip and projection are disengaged while the enlarged portion 5 is in contact with the arm 18. It is understood, of course, that the open guard 21 is used for the purpose of placing in position the latch 8 in order that it may engage with the lip 13 on the trip 14.

The operation of the machine so far as has already been described is as follows: The operator strikes on the keyboard the figures which he wishes to have placed on his paper. The type-writer makes the figures. The same key depresses the lever O, which causes, by means of the driver N, the pins corresponding to the figures to project in the pathway of the shoulder $h$ of the respective racks H. At the same time the retaining-pin P of each of the racks corresponding to the pins struck is forced out of contact with said shoulder, leaving the racks free to move. The lever is then pulled forward, setting in motion the racks, because of the movement of the segmental wheel J, to which they are attached by spring $j$, and each rack is moved a sufficient distance to bring the numbers on their wheels respectively forward and into line at the front of the machine. The lever returns to its normal position by the action of the spring 100, secured to the segment W and to the frame of the machine, (see Figs. 28, 29, and 30,) and is preferably eased in its movement backward by means of a dash-pot 24 or other suitable device. Let us suppose that the figures written are "125." We are to add to that "216." The operator strikes the keys, and the figures "216" are written below the figures "125." The racks are set in motion, as above stated. The first wheel F is rotated until it comes to the "1," when there must be a carry of one, since we pass the naught. The lift 10 when the zero-point is reached strikes the latch 8, and, releasing the trip 14, the pawl 15 on the trip, being in engagement with one of the projections in the next adjacent wheel F when the lever T was reversed, moved it forward one space. There will then be registered on the second wheel the sum of "2" that was there in the first place and the "1" caused by the rotation of the second wheel by the rack and the further "1" caused by the operation of the pawl, making the wheel stand at "4." The third wheel has added to it the "2" caused by the rotation of the third wheel, besides the "1" which was there in the first instance, making the wheel show "3" and the addition stands on the wheels "341." For the purpose of forcing back the pins P, Fig. 2, after they have been released by the projection P² on the rocking lever P', I preferably arrange on the carriage R the projection 70, (see Fig. 17,) which will engage with the pins P, and the movement of the carriage will force them back in position. In like manner the projection 71 (see Fig. 8) on the carriage R returns the pins K to their normal position after the movement of the racks. It is necessary to arrange for returning all of the adding-wheels F to the zero position when about to commence to add a new column of figures. To do this, I have arranged a key 41, Figs. 2 and 16, for each section of wheels, preferably placed at the top of the machine, provided at its end with an inclined portion 42, adapted to engage with one of the lifts 10 on the adding-wheel, and also provided with a rod 43, connected with the yoke 44, which yoke engages with each of the pins P and which yoke is fulcrumed to the frame of the machine at 45. Thus by pressing in on the key 41, together with the operation of the lever, each of the racks is released from its retaining-pin P, and they are allowed to revolve under the influence of the springs attached at their ends to the segmental wheel J until the lift on each wheel engages with its key 41. The wheels are then registering at zero. It is necessary to arrange a tabulator in connection with the machine in order that the figures to be added may be placed on the paper in their proper position, as tens, hundreds, thousands, &c. To do this, it would be necessary to move the type-writer carriage and also the carriage of the adding-machine attached to it to the desired position. To accomplish this, I show in Figs. 22, 23, and 24 a tabulating device. I place an arm 25, attached to a rod 26, which has at its end a bevel-gear 27 engaging with a bevel-gear 28 on the end of a vertical rod 29, the vertical rod 29 having secured to it at its upper end a gear 30, meshing with a rack 31, which rack is movable upon a frame 60, which frame is preferably provided with a dovetailed slot within which the rack reciprocates, as shown in Fig. 24. The frame 60 is supported along one edge thereof by the rod 37 and is capable of a rocking motion thereon. Along one side of the frame 60, opposite to that of the rod 37, I arrange projecting lugs 32, each having an inclined upper surface adapted to pass under the type-writer carriage-rack 33 when the frame 60 is rocked or tilted on the rod 37, and thus as the wedge-shaped surface of the lug 32 passes beneath the type-writer rack 33 it will lift the type-writer rack from engagement with the type-writer wheel 61. The type-writer wheel 61 is the wheel in ordinary use on type-writers and which engages with the serrated rack attached to the carriage, and by the operation of which wheel the carriage is moved from right to left. The carriage of the type-writer, and therefore the carriage of the adding-machine, will then be carried forcibly by means of the spring (not shown) of the type-writer carriage. For the purpose of stopping the rack of the type-writer in a required position I have placed on the rack 31 a finger 34, which will by the rocking or tilting of the frame 60 be forced forward in the path of one of a series of pins 35, placed in the projection 36 in the end of the type-writer rack 33, which will stop the rack in the desired position. Thus by lifting up on the handle 38 of the arm 25 I push forward the lugs 32 and pin 34, making an engagement between the lug and the type-writer rack, and put the pin 34 in the line of the path of one of the pins 35. After the type-writer carriage has been released from engagement with the wheel 61 it will be carried with considerable force and speed toward the left side of the machine, and if we depend solely upon the engagement of the finger 34 and the pin 35 there would be a considerable jar communicated to the rods 29 and 26 and their connections. In order to prevent the transmission of impact between the finger 34 and the pin 35, I preferably arrange a plate 62, provided with a series of holes through which the finger 34 will pass and beyond which plate 62 will project, and adjacent to which plate 39 will engage with the finger. Plate 62 is secured to the frame of the machine and will take substantially the force of the blow occasioned by the engagement of the said finger and pin. I preferably place in front of the machine a plate 39, provided with a series of indentations 40, within which a point on the crank 25 may engage each one of said indentations corresponding to the position of units, tens, hundreds, thousands, which will be the corresponding position at which the type-writer carriage will be stopped when the crank-arm is moved to one of said positions, respectively, the movement of the rods 26 and 29 bringing the rack 31 to the position required for the projection of the pin 34 in the line of the path of the desired pin 35 in the projection on the end 36 of the type-writer carriage.

In Figs. 25, 26, and 27 I show a modified form of mechanism for operating the adding-wheel racks and for bringing into engagement therewith the operating-pins. By this modified form I do away with the segmental wheel J and simply carry upon the shaft 1 the gear-wheels 64 and 65 and small gear-wheel $u$. The gear-wheel $u$ engaging with the segment U, attached to the lever, as shown in Fig. 2, as well as in Figs. 25 and 27. Segment U, engaging with the gear-wheel $u$ and gear 64 on one side of the machine, engaging with the rack which is placed on the side of the pin-carrying plates L, gear 65 on the other side of the machine likewise engaging with the rack with which is connected the pin-carrying plates L. Plates L are suitably mounted at their ends to allow for their movement up and down within the frame of the machine. As thus arranged, as the lever T is pulled forward and sets in motion the gears 64 and 65, the pins K having been projected so that they will engage upon the forward movement of the plate L with the shoulder $h$ of the racks H, respectively, the racks are lifted by the movement of the plates L, and thus the adding-wheels rotated to the point which is determined by the location of the pins K. For the purpose of returning the racks after the movement of the plates L, I arrange a projection 66, Fig. 26, on the plates L, which will engage with the upper surface of the shoulder $h$ of the racks H and with the reverse movement of the lever draw the racks H back to their normal position. By this arrangement of the racks I do away with the use of the retaining-pins P, segmental wheel J, and the spring $j$, attached to the rack H.

What I claim as my invention, and desire to secure by Letters Patent, is—

1. A type-writing machine, an adding device adapted to be connected therewith, consisting of a carriage; a means for connecting said carriage with the carriage of said type-writing machine; a means for causing the carriage of the adding device to move in a direction opposite to that of the carriage of the type-writing machine; a series of pins carried by the carriage of said adding device; a series of adding-wheels; a series of racks; a means for causing a partial revolution of said adding-wheels by the movement of said racks, respectively; a series of pins arranged to be operated upon by the pins in said carriage respectively, whereby they are placed in position to determine the amount of the revolution of the said adding-wheels, respectively; a means for imparting motion to said racks, substantially as described.

2. The combination of a type-writing machine and an adding device, said adding device consisting of a series of adding-wheels; a series of racks; a mean for causing a partial revolution of said wheels by the movement of said racks, respectively; a series of pins arranged to be placed in the path of the movement of said racks, respectively; a carriage provided with means for acting upon said pins, respectively; a means for connecting said carriage with the carriage of said type-writing machine; a means for setting said racks in motion, substantially as described.

3. The combination of a type-writing machine and an adding device; said adding device comprising a series of adding-wheels; each of said adding-wheels provided on its periphery with the numerals zero to nine inclusive; with a means when said wheels are revolved, respectively, to zero for causing the next adjacent wheel to the left to be moved one numeral, making the "carry," a series of racks; a means for causing a partial revolution of said wheels by the movement of said racks, respectively; a series of pins arranged to be placed in the path of the movement of said racks, respectively; a carriage provided with means for acting upon said pins, respectively; a means for connecting said carriage with the carriage of said type-writing machine; a means for setting said racks in motion, substantially as described.

4. The combination of the type-writing machine and an adding-machine device; said adding device comprising a series of adding-wheels; a series of racks; a means for causing a partial revolution of said wheels by the movement of said racks, respectively; each of said adding-wheels provided on its periphery with the numerals zero to nine, inclusive; with a means when said wheels are revolved, respectively, to zero for causing the next adjacent wheel to the left to be moved one numeral, making the "carry;" a series of pins adapted to be projected within the path of the movement of said racks, respectively; a means connected with the carriage of said type-writing machine for operating said pins with a means for imparting motion to said racks, substantially as described.

5. The combination of a type-writing machine and an adding device; said adding device consisting of a series of adding-wheels; each of said adding-wheels provided on its periphery with the numerals zero to nine inclusive; with a means when said wheels are revolved, respectively, to zero for causing the next adjacent wheel to the left to be moved one numeral thereof, making the "carry;" a series of racks; a means for imparting motion thereto whereby said wheels will be revolved, respectively; a means for arresting the movement of said racks, respectively; a carriage provided with a means for putting in operation the means for arresting the movement of said racks; a means for connecting said carriage to the carriage of said type-writing machine, substantially as described.

6. In an adding device; a series of adding-wheels, each of which is provided on its periphery with the numerals from zero to nine inclusive; each of said wheels provided with a means for engaging with the rack; a series of racks arranged to cause a partial revolution of each of said wheels, respectively; a lever, by the movement of which said racks and adding-wheels are set in motion; a series of trips adapted to engage with the said wheels, respectively; a series of latches arranged to hold said trips out of the engagement with said wheels, respectively; a means for causing said latches to lock with said trips; a means on said wheels for disengaging said latch from said trip when the wheel is revolved past zero thereon and causing said trip to engage the wheel next adjoining the one which operates said latch; a means for imparting motion through said trips to the wheel with which it engages sufficient to move said wheel one numeral, thus making the "carry;" a means for preventing movement of the trip after its engagement with the adjoining wheel to make the "carry" until the reverse movement of said lever liberates said trip, substantially as described.

7. In an adding device, a series of adding-wheels, each of said wheels provided with a series of divisions on its periphery, each of said divisions numbered from zero to nine, inclusive; a means for imparting motion to said wheels, respectively, each of said wheels provided with a series of lifts, the said lift arranged adjacent to the zero position of each of said divisions; a series of trips; a lip arranged on each of said trips; a pawl carried by each of said trips; a series of latches; a projection on each of said latches adapted to engage with each of said lips, respectively; said pawls adapted to engage with the periphery of said wheels; each of said latches arranged to project within the pathway of said lifts, respectively, so adjusted and connected up that when one of the lifts engages with the latch, the projection thereon will be removed from contact with the lip of the trip; a shaft flattened along part of its contour for causing the trip to move after said disengagement; said pawl and said trip by said movement brought in contact with the periphery of the next adjacent wheel and cause said wheel to revolve one division thereof; with a means for returning said trip to engagement with said latch and the connection of the projection thereon with said lip, substantially as described.

8. The combination of a type-writing machine and an adding device, with a series of levers adapted to engage with some of the key-levers of the type-writing machine; a series of drivers adapted to engage with said first-mentioned levers; a series of pins mounted in the carriage of the adding device arranged to be operated upon by said drivers, respectively; a series of pins adapted to project within the pathway of the racks, respectively; a series of racks; a series of adding-wheels; a means for imparting motion to said adding-wheels by the movement of said racks, substantially as described.

9. The combination of a type-writing machine with a series of levers; a means for mounting said levers beneath the key-levers of the type-writing machine; with a means for moving each of said levers upon its support in such a manner as to disengage the connection between the lever and the key-lever; a series of drivers operated by the movement of said levers, respectively; a carriage; a means for connecting the carriage with the carriage of a type-writing machine; a series of pins mounted on said carriage; each of said drivers adapted to engage with said pins, respectively; a series of racks; a series of adding-wheels; a means for carrying motion to said adding-wheels by the movement of said racks, respectively; with a means for limiting the movement of said racks by the operation of said drivers on said pins in said carriage; with a means for imparting movement to said racks, substantially as described.

10. The combination of a type-writing machine; a series of levers pivoted beneath the key-levers operating the figures on the type-writing machine, respectively; a series of drivers operated by the action of said first-mentioned levers; a means for limiting the movement of a series of racks by the operation of said drivers; a series of adding-wheels; a series of racks; a means for causing a partial revolution of said adding-wheels by the movement of said racks, respectively; a means for setting said racks in motion, substantially as described.

11. The combination of a type-writing machine; a series of levers placed beneath and engaged with the key-levers operating the figures of the type-writing machine; a series of drivers operated by said first-mentioned levers; a series of racks; a series of adding-wheels; a means for causing a partial revolution of said wheels by the movement of said racks, respectively; a series of retaining-pins for holding said racks; a rocking lever, by the movement of which said racks may be released; a means attached to said driver for operating said rocking lever, substantially as described.

12. In a combined type-writing machine and adding device; a series of pins carried by the carriage of the type-writer, near one end thereof; a rocking frame; a carriage-wheel; a projection on said rocking frame adapted to engage with said carriage and lift the same from connection with the carriage-wheel; a rack carrying a finger mounted in said frame; a means for moving said rack in a horizontal plane; with a means for tilting said frame in such a manner as to bring said finger within the pathway of the movement of said pins on the carriage, substantially as described.

13. In a combined type-writing machine and adding device; a series of pins carried by the rack of the type-writing-machine carriage; a frame suitably mounted; projection on said frame arranged to pass under the carriage of the type-writing machine when said frame is tilted; a rack mounted in said frame; a finger carried by said rack; a pinion engaging with said rack carried by a spindle; a means for operating said pinion in such a manner as to move said rack in a horizontal plane; an indicating device arranged in connection with said spindle, by means of which the extent of the movement of the finger on said rack may be determined by the position given to said indicator; a means for tilting said frame and rack in such a manner as to bring said finger in the path of the movement of said pins in the type-writing-machine carriage-rack, substantially as described.

14. In a combined type-writing machine and adding device; a frame; suitably-mounted projection on said frame, arranged to extend beneath the rack of the carriage of the type-writing machine when said frame is tilted; a rack mounted in said frame; a finger carried by said rack; a pinion meshing with said rack; a spindle carrying said pinion; beveled gear carried by said pinion; pinion carrying a beveled gear meshing with that on first-mentioned pinion; indicating-arm attached to said last-mentioned spindle; block provided with openings through which said finger may project; a series of projections arranged on the end of the rack of the typewriter carriage; a means for tilting said frame bringing the projections thereon beneath the rack of the type-writer carriage and said finger through one of the openings in said block within the path of one of the projections on said type-writer carriage-rack, substantially as described.

15. In a combined type-writing machine and adding device; a base-plate; a series of adjustable feet, each foot provided with a socket within which the foot of the type-writing machine may enter; a bolt passing through said socket, within a slot in the plate, by the adjustment of which bolt the position of the socket may be altered to correspond to the position of the foot on the type-writing machine, substantially as described.

16. In a combined type-writing machine and adding device; a series of adding-wheels carrying along their peripheries suitable divisions, on each of which is placed a numeral extending from zero to nine, inclusive; a series of racks; a means for imparting a rotary movement to said wheels by the movement of said racks, respectively; a means for limiting the movement of each of said racks to correspond to the extent of the rotation necessary to be given to the adding-wheels to cause the adding-wheels to move a number of spaces, corresponding to the number desired by the operator; a lever; suitable connection between said lever and said racks by means of which the operation of said lever will tend to lift said racks until they are arrested in their movement by said limiting means; said means for limiting the movement of said racks being put in operation by the movement of the keys of the type-writing machine, substantially as described.

17. In a combined type-writing machine and adding device; a type-writer - machine carriage; a carriage for the adding device; a means for connecting the two; adding-device carriage provided with a series of pins; a means for causing said pins to be operated upon by the movement of the keys carrying the numerals of the type-writing machine; a series of pins with which the pins of said carriage engage, respectively, and by means of which they are projected within the path of the series of racks; a series of racks; a series of adding-wheels; a means for imparting rotary motion to said adding-wheels by the movement of said racks, respectively; a series of retaining-pins for holding said racks in their normal position; a means connected with said carriage of returning to their normal position said retaining-pins and also a means for returning to their normal position, after the movement of the racks, any of the pins which may have been projected within the path of said racks, substantially as described.

Signed at Albany, New York, this 28th day of March, 1903.

CLARENCE R. MARTINEAU.

Witnesses:
 FREDERICK W. CAMERON,
 LOTTIE PRIOR.